May 6, 1947.  A. H. B. WALKER  2,420,213
APPARATUS FOR FREQUENCY MULTIPLICATION OF
ALTERNATING ELECTRIC CURRENTS
Filed May 2, 1945
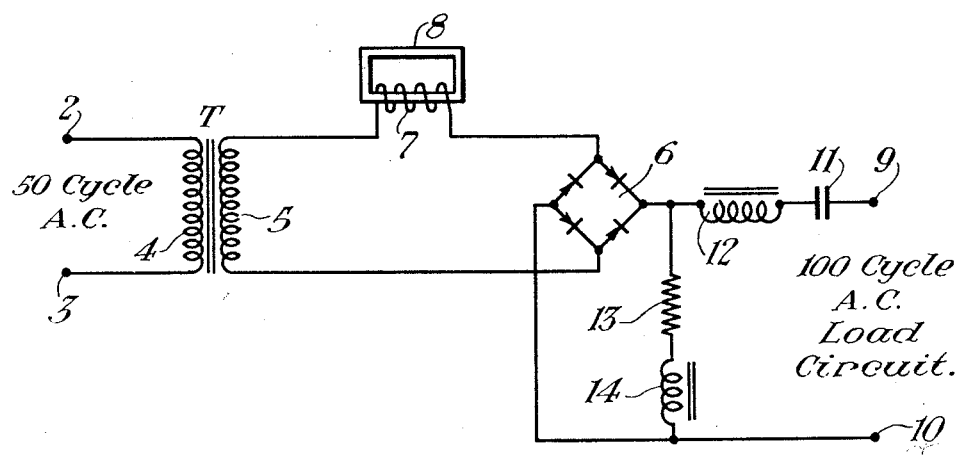
INVENTOR.
Alec Hervey Bennett Walker.
BY
HIS ATTORNEY Patented May 6, 1947

2,420,213

UNITED STATES PATENT OFFICE 2,420,213

APPARATUS FOR FREQUENCY MULTIPLICATION OF ALTERNATING ELECTRIC CURRENTS

Alec Hervey Bennett Walker, London, England, assignor, by mesne assignments, to The Union Switch and Signal Company, Swissvale, Pa., a corporation of Pennsylvania Application May 2, 1945, Serial No. 591,524
In Great Britain July 11, 1944

2 Claims. (Cl. 172—281)

This invention relates to apparatus for frequency multiplication of alternating electric currents of the kind in which the frequency multiplication is effected by causing continuously successive half waves of current of the frequency to be multiplied and of the same sign to flow in the circuit in which current of the multiple frequency is required, either by reversing alternate half-waves of a single phase alternating current supply by means of a full wave rectifier device or by preventing the flow of current in alternate half-waves in each phase of a polyphase current supply by means of a suitable rectifier.

The unidirectional current flowing in the circuit to be supplied will thus comprise a multiple frequency component which is however relatively small and the invention has for its object to provide improved apparatus of the character above described in which the multiple frequency current is considerably increased and its wave form rendered more nearly sinusoidal.

According to the present invention a relatively large current component of third harmonic frequency is introduced into each phase of the alternating current supplied thereby increasing the relative value of the multiple frequency or "ripple" component of the total unidirectional current and improving the wave form of this component.

Preferably the third harmonic current component is introduced into the input alternating current wave by connecting in series with the input circuit of the apparatus a choke coil having a magnetic core designed to be operated at a flux density such as to cause a strongly peaked current wave in the input circuit.

I shall describe one form of apparatus embodying my invention, and shall then point out the novel features thereof in claims.

The accompanying drawing is a diagrammatic view showing one form of apparatus embodying my invention when used for the production of a double frequency current from a single phase supply.

Referring to the drawing, the reference characters 2 and 3 designate the terminals of a supply source of a single phase alternating current here indicated as having a frequency of 50 cycles per second. Primary winding 4 of a transformer T is connected across terminals 2 and 3 to supply from secondary 5 a 50 cycle alternating current of a preselected voltage. The input terminals of a full wave rectifier 6 are connected to secondary winding 5 through a choke coil 7. Choke coil 7 is wound on a magnetic core 8 constructed to have no appreciable air gap and of a cross section so as to be operated at a flux density which extends cylically substantially above and below the "knee" of the B-H curve of the core material.

The output terminals of rectifier 6 are connected to terminals 9 and 10 of a load circuit of any desired nature. An acceptor device comprising a condenser 11 and an inductance 12 may be connected in the connection to the load circuit and tuned to double the frequency of the original source. A connection including a resistor 13 and an inductance 14 is preferably connected across the output terminals of the rectifier to form a consuming load for the direct current component of the rectifier output. Inductor 14 is proportioned to substantially block or reject the 100 cycle component of the rectifier output and such alternating current output is applied to the load circuit.

It is clear that a third harmonic current component is introduced into the input current wave to cause a strongly peaked current wave. Such distortion of the wave form of the input current greatly reduces the wasted direct current component of the rectifier output. In this way the wave form of the doubled frequency alternating currents of the load circuit can be made to coincide more exactly, the amount of wasted direct current power can be reduced, and the double frequency output power can be increased.

The invention is evidently not limited to the particular form of apparatus above described by way of example.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a supply source of alternating current of a given frequency, a full wave rectifier, a reactor having a coil wound on a magnetizable core, said supply source and said reactor coil in series connected to the input terminals of said rectifier, said reactor core proportioned to introduce a relatively large current component of third harmonic frequency, a load circuit connected to output terminals of said rectifier through inductance and capacitance tuned to resonance at a frequency double said given frequency, and means connected to the output terminals of said rectifier in multiple with the load circuit to absorb the direct current component of the rectifier output, whereby an alternating current wave of double said given frequency and of a relatively large percent of the input power is passed to said load circuit.

2. In combination, a supply source of alternating current of a given frequency, a full wave rectifier, a reactor having a coil wound on a magnetizable core, said supply source connected to the input terminals of said rectifier through said reactor coil, said reactor core proportioned to introduce a relatively large current component of third harmonic frequency, and a load circuit connected to output terminals of said rectifier through inductance and capacitance tuned to resonance at a frequency double said given frequency, and a circuit connection including a resistance and inductance to absorb the direct current component of the output of said rectifier.

ALEC HERVEY BENNETT WALKER.

REFERENCES CITED

The following references are of record in the file of this patent:

UNITED STATES PATENTS

| Number | Name | Date |
| --- | --- | --- |
| 2,117,752 | Wrathall | May 17, 1938 |
| 736,884 | Shoemaker et al. | Aug. 18, 1903 |
| 2,130,508 | Peterson | Sept. 20, 1938 |
| 2,150,386 | Manley | Mar. 14, 1939 |